US008347552B1

(12) United States Patent
Johnson, III

(10) Patent No.: US 8,347,552 B1
(45) Date of Patent: Jan. 8, 2013

(54) POTTED PLANT POT AND SAUCER CONSTRUCTION

(76) Inventor: Johnny Johnson, III, New Orleans, LA (US)

( * ) Notice: Subject to any disclaimer, the term of this patent is extended or adjusted under 35 U.S.C. 154(b) by 12 days.

(21) Appl. No.: 12/951,259

(22) Filed: Nov. 22, 2010

Related U.S. Application Data

(60) Provisional application No. 61/262,992, filed on Nov. 20, 2009.

(51) Int. Cl.
*A01G 25/00* (2006.01)
(52) U.S. Cl. .......................................................... 47/81
(58) Field of Classification Search ............ 47/81, 65.5, 47/79, 80, 82
See application file for complete search history.

(56) References Cited

U.S. PATENT DOCUMENTS

| 320,588 | A | | 6/1885 | Rhoads |
| 1,342,786 | A | | 6/1920 | White |
| 2,802,305 | A | | 8/1957 | MacNaughton |
| 4,184,287 | A | * | 1/1980 | Roth ................................. 47/81 |
| 4,219,967 | A | | 9/1980 | Hickerson |
| 4,339,891 | A | | 7/1982 | Bassett |
| 4,343,109 | A | | 8/1982 | Holtkamp |
| D279,175 | S | | 6/1985 | Eklof |
| 4,965,963 | A | | 10/1990 | Lyon |
| 5,129,183 | A | * | 7/1992 | Haw ................................. 47/81 |
| 6,370,819 | B1 | * | 4/2002 | Reiss et al. ........................ 47/81 |
| 6,986,224 | B2 | * | 1/2006 | Gelfer .............................. 47/81 |
| 7,171,783 | B1 | * | 2/2007 | Fidotti ............................. 47/81 |

* cited by examiner

*Primary Examiner* — Monica Williams
(74) *Attorney, Agent, or Firm* — Garvey, Smith, Nehrbass & North, L.L.C.; Charles C. Garvey, Jr.; Vanessa M. D'Souza

(57) ABSTRACT

An excess water control device for a potted plant provides a pot having a side wall, bottom wall, interior, open top, and one or more openings in the bottom wall. A soil mass is contained within the pot interior, occupying the pot interior with a growing plant. One or more wicking feet support the pot, each foot extending from a position below the pot to the pot interior and the contained soil medium. Each foot can be of a larger diameter lower section upon which the pot rests and a smaller diameter upper section that engages the soil mass inside the pot.

18 Claims, 3 Drawing Sheets

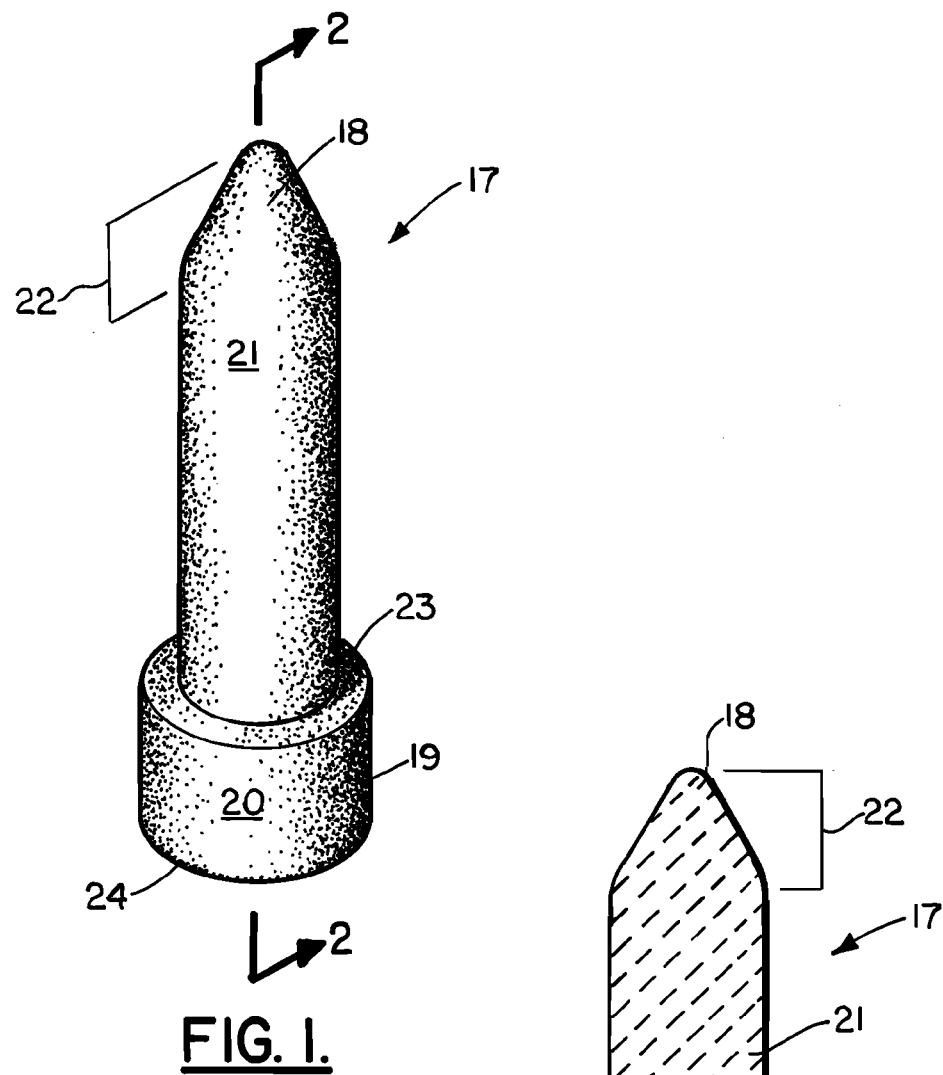
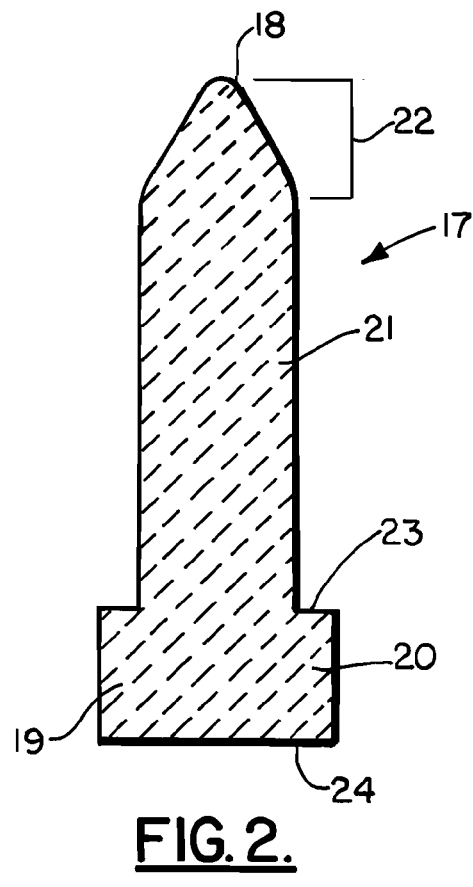
FIG. 1.
FIG. 2.

POTTED PLANT POT AND SAUCER CONSTRUCTION

CROSS-REFERENCE TO RELATED APPLICATIONS

This is a non-provisional of U.S. Provisional Patent Application Ser. No. 61/262,992, filed Nov. 20, 2009, which application is incorporated herein by reference, and priority of which is hereby claimed.

Priority of U.S. Provisional Patent Application Ser. No. 61/262,992, filed Nov. 20, 2009, which application is incorporated herein by reference, is hereby claimed.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The present invention relates to an improved wicking apparatus for use with potted plants. More particularly, the present invention relates to an improved potted plant pot and wicking arrangement wherein the pot has a bottom with openings accommodating a plurality of wicking feet that support the pot and extend upwardly through the pot bottom holes to engage saturated soil at the bottom of the pot, thereby wicking same to thus regulate the supply of water to the plant.

2. General Background of the Invention

Common potted plants typically use a drain openings in the pot bottom. The pot bottom rests upon a saucer that is supposed to collect excess water when the plant is watered. The saucer retains water. In theory, the plant can soak up this excess water in dry periods when the owner fails to water timely. However, over watering is the most common cause of the death of house plants. Over watering leaves the pot soil saturated, contributing to root rot and death of the plant.

Some patents have issued that provide a double wall construction of a saucer for holding water. In such a situation, there is a lower section that carries water and an upper section that rests upon the lower section providing a water reservoir and which also supports the pot. Some patents have issued which have wicking features. The following table lists examples of such patents:

TABLE 1

| Pat. No. | Title | Issue Date |
| --- | --- | --- |
| 1,342,786 | Plant Irrigating Device | Jun. 8, 1920 |
| 2,802,305 | Flowerpot Attachment | Aug. 13, 1957 |
| 4,219,967 | Flower Pot Watering Apparatus | Sep. 2, 1980 |
| 4,339,891 | Plant Supporting and Watering Device | Jul. 20, 1982 |
| 4,343,109 | Capillary Disc and Support Therefor | Aug. 10, 1982 |
| 279,175 | Water Reservoir For Potted Plants | Jun. 11, 1985 |
| 320,588 | Flower Pot | Jun. 23, 1885 |
| 4,965,963 | Platform and Watering System For Plants | Oct. 30, 1990 |

One of the problems of prior art pot and saucer arrangements is the over watering of plants, contributing to root rot and loss of the plant.

BRIEF SUMMARY OF THE INVENTION

The present invention provides an potted plant and pot arrangement of improved construction, employing a combination foot and wick that both supports the plant and removes excess water from the soil in the pot.

BRIEF DESCRIPTION OF THE DRAWINGS

For a further understanding of the nature, objects, and advantages of the present invention, reference should be had to the following detailed description, read in conjunction with the following drawings, wherein like reference numerals denote like elements and wherein:

FIG. 1 is a partial perspective view of a preferred embodiment of the apparatus of the present invention.

FIG. 2 is a partial sectional view of a preferred embodiment of the apparatus of the present invention.

DETAILED DESCRIPTION OF THE INVENTION

Figure 3:
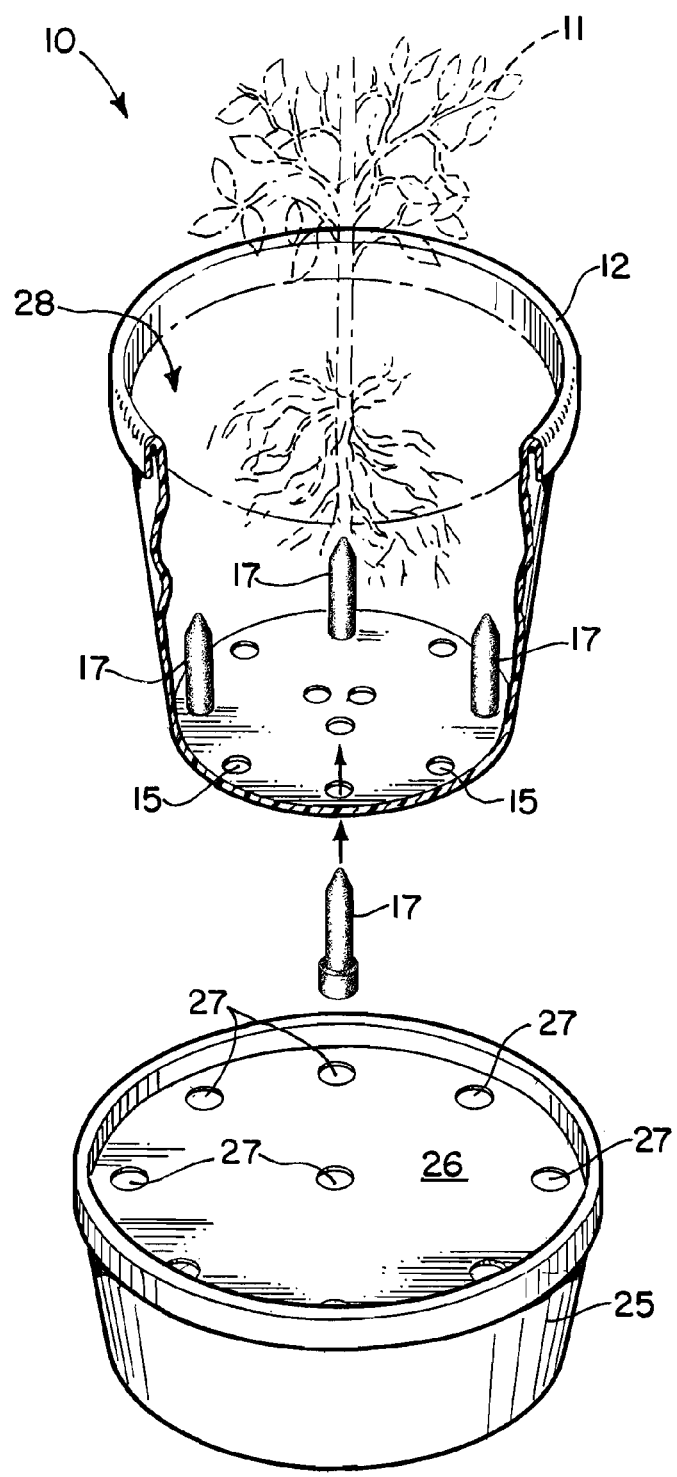
FIG. 3 is an exploded perspective view of a preferred embodiment of the apparatus of the present invention.
Figure 4:
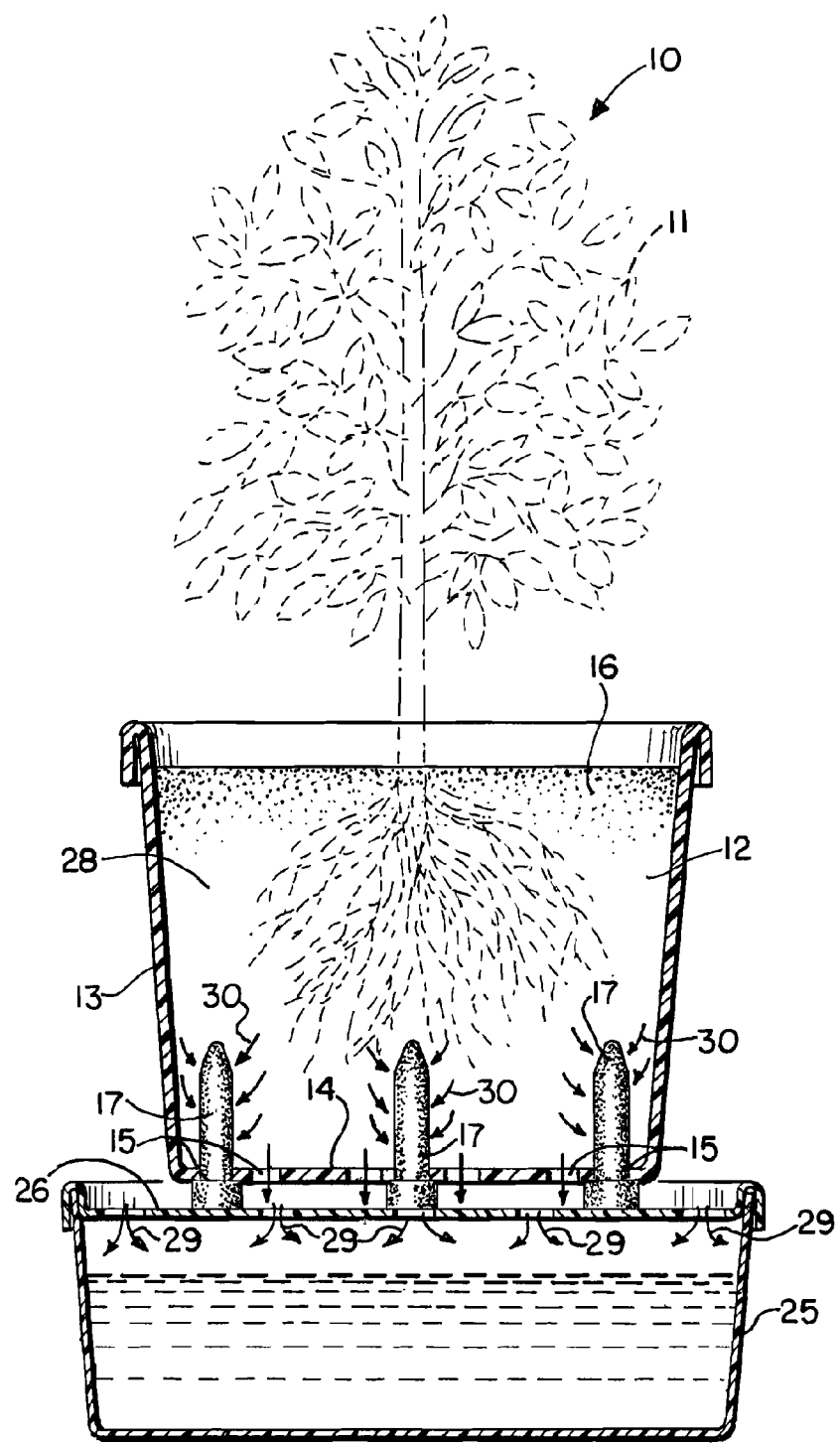
FIG. 4 is a sectional view of a preferred embodiment of the apparatus of the present invention.

Potted plant wicking apparatus 10 is shown in FIGS. 1-4, resting upon a receptacle or catch basin 25 which collects excess water. Even though receptacle or basin 25 catches excess water, root rot can still result if a plant is watered every day.

In FIGS. 1-4, pot 12 has a pot side wall 13 and pot bottom 14 which can be flat an circular. One or more openings 15 extend through pot bottom 14 and into the interior 28 of pot 12 which contains a soil mass 16 or other growing medium for sustaining plant 11.

The present invention combines pot 12 with a foot or feet 17. Each foot or feet 17 is preferably of a wicking material such as vitreous clay or other wicking material. Each foot or feet 17 is also structural, in that it supports pot 12 a small distance (e.g., inches) above an underlying support such as receptacle or basin 25.

Feet or foot 17 has an upper end portion 18 and a lower end portion 19. The lower end portion 19 can be a generally cylindrically shaped section 20 and of a first, larger diameter that is larger than the diameter of an opening 15. The upper end portion 18 provides a smaller diameter section 21 which can also be generally cylindrically shaped and of a diameter which is equal to or smaller than the diameter of an opening 15. In this fashion, smaller diameter section 21 will fit through an opening 15 and into the soil mass 16 for wicking excess moisture in soil mass 16. Larger diameter section 21 will not fit through opening 15.

An annular shoulder 23 separates or transitions between each of said sections 20, 21. A tapered or conical tip 22 is affixed to the smaller diameter section 21 as shown. Conical tip 22 is sized and shaped to enable an easy fit of tip 22 and section 21 through opening 15. Pot 12 bottom 14 rests upon annular shoulder 23. In the drawings, there are four (4) feet 17. Each said foot 17 extends partially through an opening 15 in pot bottom 14 as shown. In each case, the smaller diameter section 21 and conical tip 22 fit through an opening 15 and engage the contained soil mass 16 inside pot 12. Each foot 17 has a flat bottom 24 which can be generally circular in shape.

This flat bottom 24 of each foot 17 rests upon an underlying support surface such as the upper panel 26 of excess water receptacle or basin 25. Panel 26 is provided with one or more drain holes 27 for allowing water to drain from pot 12 indicated by arrows 29 into receptacle 25. Water that does not so drain will be wicked by feet 17 as indicated by arrows 30 in FIG. 4. In this fashion, a plant 11 can be watered frequently without fear of over watering and the malady of root rot.

The following is a list of suitable parts and materials for the various elements of the preferred embodiment of the present invention.

| PART NUMBER | DESCRIPTION |
| --- | --- |
| 10 | potted plant/wicking system |
| 11 | plant |
| 12 | pot |
| 13 | pot side wall |
| 14 | pot bottom |
| 15 | pot bottom opening |
| 16 | soil mass |
| 17 | wicking foot |
| 18 | upper end |
| 19 | lower end |
| 20 | larger diameter section |
| 21 | smaller diameter section |
| 22 | conical tip |
| 23 | annular shoulder |
| 24 | flat circular bottom |
| 25 | excess water receptacle/basin |
| 26 | upper panel |
| 27 | drain hole |
| 28 | interior |
| 29 | arrow |
| 30 | arrow |

All measurements disclosed herein are at standard temperature and pressure, at sea level on Earth, unless indicated otherwise. All materials used or intended to be used in a human being are biocompatible, unless indicated otherwise.

The foregoing embodiments are presented by way of example only; the scope of the present invention is to be limited only by the following claims.

The invention claimed is:

1. A potted plant and excess water control apparatus, comprising:
   a) a pot having a side wall, bottom wall, an interior, an open top, and one or more pot drain openings in the bottom wall;
   b) a plant growing medium that occupies the pot interior;
   c) a plurality of wicking feet that support the pot in an elevated position, each foot extending from a position below the pot to the pot interior and the contained growing medium;
   d) each said wicking foot including a lower cylindrical section of a first larger diameter that is larger in diameter than the diameter of a said pot drain opening and an upper cylindrical section of a second smaller diameter that is smaller in diameter than the first larger diameter;
   e) an annular shoulder defining a transition between the said larger diameter section and the said smaller diameter section, the annular shoulder supporting the pot wherein the pot bottom wall rests upon the annular shoulders of the wicking feet;
   f) wherein the wicking feet extend through a pot drain opening to place the upper smaller diameter section in contact with the growing medium so that excess moisture in the growing medium is absorbed by the upper smaller diameter section and wicked to the larger diameter section at a position outside of the pot interior; and
   g) a receptacle placed below the feet, the receptacle having a lower portion and a top portion with an upper surface, each foot resting upon the said receptacle top portion upper surface, the receptacle having a reservoir contained in the lower portion and below the top portion for holding water that drains from the pot interior via the drain opening and feet; and
   h) the top portion having one or more outlets that enable water flow from the said upper surface to the said reservoir.

2. The potted plant and excess water control apparatus of claim 1 wherein there are at least three of said wicking feet.

3. The potted plant and excess water control apparatus of claim 1 wherein each of said wicking feet is of a porous material.

4. The potted plant and excess water control apparatus of claim 3 wherein each of said wicking feet is of a porous clay material.

5. The potted plant and excess water control apparatus of claim 3 wherein each of said wicking feet is of a porous ceramic material.

6. The potted plant and excess water control apparatus of claim 1 wherein the foot upper section has a tapered portion.

7. The potted plant and excess water control apparatus of claim 6 wherein the tapered portion has a cone shape.

8. The potted plant and excess water control apparatus of claim 1 wherein the foot upper section has a tapered portion that tapers from the foot upper section to a pointed tip.

9. The potted plant and excess water control apparatus of claim 1 wherein the receptacle has an air space in between the water in the reservoir and the wicking feet.

10. A potted plant and excess water control apparatus, comprising:
    a) a pot having a side wall, bottom wall, an interior, an open top, and a plurality of at least three pot drain openings in the bottom wall;
    b) a plant growing medium that occupies the pot interior;
    c) a plurality of at least three wicking feet that support the pot in an elevated position, each foot extending from a position below the pot to the pot interior and the contained growing medium;
    d) each said wicking foot including an upper section and a lower section;
    e) wherein the wicking feet only partially extend through a pot drain opening to place the upper section in contact with the growing medium so that excess moisture in the growing medium is absorbed by the upper smaller diameter section and wicked to the lower section at a position outside of the pot interior; and
    f) a receptacle placed below the feet, the receptacle having an upper panel, each foot resting upon the receptacle upper panel, the receptacle having a reservoir below the upper panel for holding water that drains from the pot interior via the drain openings and feet; and
    g) one or more openings in the upper panel that enable water flow from the upper panel to the reservoir.

11. The potted plant and excess water control apparatus of claim 10 wherein there are three of said wicking feet.

12. The potted plant and excess water control apparatus of claim 10 wherein each of said wicking feet is of a porous material.

13. The potted plant and excess water control apparatus of claim 12 wherein each of said wicking feet is of a porous clay material.

14. The potted plant and excess water control apparatus of claim 12 wherein each of said wicking feet is of a porous ceramic material.

15. The potted plant and excess water control apparatus of claim 10 wherein each wicking foot has a tapered portion.

16. The potted plant and excess water control apparatus of claim 15 wherein the tapered portion has a cone shape.

17. The potted plant and excess water control apparatus of claim 10 wherein the upper section has a tapered portion that tapers from the upper section to a pointed tip.

18. The potted plant and excess water control apparatus of claim 10 wherein the receptacle has an air space in between the water in the reservoir and the wicking feet.

\* \* \* \* \*